tions. In order for the magnesium oxide to be most effective, the entire reactor should be filled with particles of the magnesium oxide and maintained at the reaction temperature.

Magnesium oxide retains its catalytic activity for several days under continuous operating conditions with little loss of its specific activity. Over long periods of operation, carbon deposition may gradually decrease the specific activity. When this occurs, the catalyst is readily regenerated by oxidation of the carbon by means of oxygen, air, or steam at flow rates such that the catalyst bed temperature does not exceed the maximum of 600° C. Air diluted with an inert gas, e.g., nitrogen, argon, etc., can be used at higher flow rates than normal air.

In order that those skilled in the art may better understand my invention, the following example is given by way of illustration and not by way of limitation. In the example, percentages are by mole percents, unless otherwise stated.

EXAMPLE 1

The magnesium oxide catalyst used in this example, was prepared from reagent grade basic magnesium carbonate powder having a minimum purity of 99.6 weight percent based on a composition of

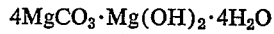
$4MgCO_3 \cdot Mg(OH)_2 \cdot 4H_2O$

This powder was placed in a rubber bag which was sealed and suspended in a liquid bath upon which an external pressure of 5,000 p.s.i. was applied. This treatment compressed the powder to a solid mass which was removed from the rubber bag and crushed and sieved to 4-20 mesh size particles.

The reactor consisted of separate reservoirs containing methanol and aniline, connected to a metering pump which fed the reactants through ¼-inch stainless steel tubing to separate vaporizers made from a 12-inch long piece of 1¼-inch O.D., 1-inch I.D. stainless steel tubing. The vaporizers were surrounded by an electrical heater maintained at 350° C. The vapors from the vaporizers were fed through ¼-inch diameter stainless steel tubing to the bottom of a vertical 28-inch quartz tube reactor, 1-inch I.D. The reactor was heated by an electrical furnace. The reactor was equipped with a thermowell made from ¼-inch quartz tubing concentrically located for the entire length of the reactor so that the catalyst bed temperature could be measured throughout the entire length of the quartz reactor tube. The reactor tube was filled with a constant volume of 180 ml. (60.3 grams) of catalyst which filled the tube to a depth of about 20 inches. The product vapors from the reactor were led to a water-cooled condenser and receiver.

The magnesium oxide catalyst was made from basic magnesium carbonate converted to the oxide by loading a reactor tube and passing air through the reactor maintained at a temperature of 550° C., for a period of three hours during which time the carbonate loses 55–57 percent of its original weight, which is 95–100 percent of theoretical loss for the conversion of the basic carbonate to magnesium oxide. Analysis of the catalyst prepared by such method revealed a surface area of 239 square meters per gram and a typical crystallite size of 50–100 A. The crystallite size increases during use of the catalyst in my process.

In this example, since three different runs were carried out, the temperature of the reaction tube was controlled at 450° C., 500° C. and 550° C. Aniline and methanol, in the proportion of 6 moles of methanol to 1 mole of aniline, were fed to the vaporizer to give a rate of addition of 0.66 mole aniline and 4.0 moles methanol per hour. The liquid hourly space velocity based on aniline was 0.33–1 hr. The pressure of the reactor was controlled at atmospheric pressure. Under these conditions, the selectivity for conversion of the aniline to N-methylaniline was about 100%. The conversions to N-methylaniline, based on aniline charged at the above temperatures and conditions were as follows:

| Temp., ° C. | Percent conversion of aniline to N-methylaniline |
|---|---|
| 450 | 54 |
| 500 | 68 |
| 550 | 47 |

The somewhat lower conversion to N-methylaniline at 550° C., is believed due to excessive methanol decomposition resulting in methanol starvation for the reaction. Improved use of methanol can be accomplished by operating in the lower part of the temperature range, by operating at high pressure (2 to 3 atmospheres) or by varying the ratio of reactants or flow rate.

In all three runs, there was no evidence of any dialkylation of the nitrogen atom or of any alkylation of the benzene nucleus.

It will, of course, be apparent to those skilled in the art that in addition to the aniline and methanol employed in the foregoing example, other aliphatic alcohols and anilino derivatives, many of which have been described previously, may be employed without departing from the scope of the invention. For example, employing essentially the same conditions as in Example 1, one can react ethanol with aniline to obtain almost exclusively N-ethylaniline.

Additionally, the conditions of reaction can be varied widely, including variations in temperature, pressure, molar concentrations, etc. In addition to using the magnesium oxide prepared as described above from basic magnesium carbonate, one can also employ commercially available magnesium oxide and magnesium oxide prepared by decomposition of magnesium hydroxide which has been compressed and thermally decomposed as described in the foregoing example. In addition, one can use with good results magnesium oxide supported on inert carriers, for example, calcium silicate, fused alumina, etc., by coating the carriers with magnesium methylcarbonate, magnesium acetate and magnesium methoxide which would then thermally decompose to the magnesium oxide.

The N-alkylated products of my invention have the same utility as the anilino derivatives produced by other synthetic processes. In addition to employing the N-alkylated anilino derivatives as dyes or dye intermediates, they can also be employed as catalysts in chemical reactions and as hydrohalide acceptors in reactions accompanied by hydrohalide release, and as stabilizers for polymeric compositions. In addition, many of the N-alkylated products can be reacted with aldehydes, for example, formaldehyde, to form resinous compositions which have good electrical properties and can be moulded to form various objects for insulation purposes. Impregnation of various porous sheets such as paper, glass fibers, glass cloth, asbestos cloth, etc., with such resins and thereafter heated at elevated temperatures on the order of about 150° to 200° C., yields laminated products having utility in applications requiring good strength and dielectric characteristics, for example, instrument panels, etc.

What I claim as new and desire to secure by Letters Patent of the United States is:

1. The process for alkylating an anilino derivative corresponding to the general formula

II

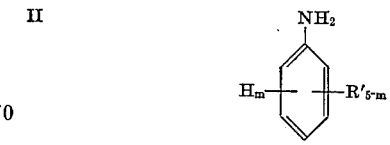

which comprises effecting reaction between said anilino derivative with an aliphatic alcohol of the general formula $HOCH_2R$ in the vapour phase in the presence of magnesium oxide as the catalyst, said reaction being carried out at a catalyst bed temperature in the range of 375°–600° C., where R is selected from the class consisting of hydrogen and monovalent hydrocarbon radicals of from 1 to 7 carbon atoms, R' is a member of the class consisting of the phenyl radical and monovalent alkyl radicals of from 1 to 6 carbon atoms, and $m$ is a whole number equal to from 0 to 5.

2. The process of claim 1 wherein the aliphatic alcohol is methanol and the reaction is carried out in the temperature range of from 450°–550° C.

3. The process of producing N-methylaniline which comprises reacting methanol with aniline in the vapor phase in the presence of magnesium oxide as the catalyst, said reaction being carried out as a catalyst bed temperature in the range of 375°–600° C.

4. The process of producing N-ethylaniline which comprises reacting ethanol with aniline in the vapor phase in the presence of magnesium oxide as the catalyst, said reaction being carried out at a catalyst bed temperature in the range of 375°–600° C.

References Cited
UNITED STATES PATENTS

| | | | |
|---|---|---|---|
| 2,323,948 | 7/1943 | Von Bramer et al. | 260—577 |
| 2,580,284 | 12/1951 | Deahl et al. | 260—577 |
| 2,813,124 | 12/1957 | Rice et al. | 260—577X |
| 3,397,237 | 8/1968 | Jackson | 260—576X |

CHARLES B. PARKER, Primary Examiner

C. F. WARREN, Assistant Examiner

U.S. Cl. X.R.

260—576

United States Patent Office 3,558,706
Patented Jan. 26, 1971

3,558,706
ALKYLATION OF AROMATIC PRIMARY AMINO GROUP
Stephen B. Hamilton, Jr., Schenectady, N.Y., assignor to General Electric Company, a corporation of New York
No Drawing. Filed Mar. 14, 1968, Ser. No. 712,920
Int. Cl. C07c 85/02, 87/62
U.S. Cl. 260—577         4 Claims

ABSTRACT OF THE DISCLOSURE

The amino group of an anilino derivative can be alkylated with an aliphatic alcohol carrying out the reaction between the ingredients in the vapor phase in the presence of a magnesium oxide catalyst at elevated temperatures. The compositions prepared by this process are useful as dyes and dye intermediates, as antiseptics, as intermediates in organic syntheses, and in the manufacture of resins, varnishes, etc.

---

This invention relates to a process for the alkylation of the amino group of an anilino compound. More particularly, the invention is concerned with a process for alkylating an anilino derivative containing a nuclearly bonded —$NH_2$ group, which comprises effecting reaction between said anilino derivative with an aliphatic alcohol of the formula I  $HOCH_2R$ in the vapor phase in the presence of magnesium oxide as the catalyst, said reaction being carried out at a temperature in the range of from 375°–600° C., where R is a member selected from the class consisting of hydrogen, alkyl, aryl, aralkyl, and alkaryl radicals.

In the following description and in the claims, the term "anilino derivative" is intended to mean aniline or derivatives thereof containing a nuclearly bonded —$NH_2$ grouping. Among such anilino derivatives may be mentioned those having the general formula

II

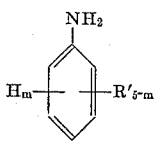

where R' is a member selected from the class consisting of nonvalent alkyl, aryl, alkaryl, and aralkyl hydrocarbon groups of from 1 to 6 carbon atoms, and $m$ is a whole number equal to from 0 to 5.

The alkylation of aniline and derivatives thereof to form N-alkylated products is known in the art. Thus, numerous catalysts have been used to react methanol with aniline to form N-methyl derivatives. Among the catalysts used have been silica gel, aluminum oxide, etc. However, in each of these instances, in addition to forming N-alkylated derivatives containing a single alkyl group, a considerable amount of the aniline becomes di-N-alkylated. In addition, a considerable amount of the aromatic nucleus becomes alkylated. Thus, great difficulty has been encountered in the past in restricting the alkylation to only one hydrogen atom of the —$NH_2$ group.

Unexpectedly, I have discovered that the alkylation of anilino derivatives, such as aniline, with an aliphatic alcohol can be carried out so as to effect essentially only monoalkylation of the amino group with essentially no detectable alkylation of the aromatic nucleus. This desirable result is accomplished by carrying out the reaction between the aliphatic alcohol and the anilino derivative containing the $NH_2$ grouping, in the presence of a magnesium oxide catalyst at a temperature sufficiently high to effect the reaction, for example, at temperatures ranging in excess of 350° C., for instance, 375–600° C. By carrying out this reaction under the conditions cited above and using magnesium oxide as a catalyst, almost exclusive monoalkylation is effected of the anilino derivative.

Among the aliphatic alcohols which can be employed in the practice of my invention under Formula I may be mentioned, for instance, methanol, ethanol, propanol, butanol, isobutanol, 2-ethylhexanol, benzyl alcohol, phenylethyl alcohol, methylbenzyl alcohol, etc. From the foregoing exemplary compounds of aliphatic alcohols, it is apparent that R in Formula I, in addition to being hydrogen can also be a monovalent hydrocarbon radical ranging from 1 to 7 carbon atoms. Advantageously, the number of carbon atoms in the aliphatic linkage between the hydroxy group and any aromatic group which R may represent is advantageously at most 4 carbon atoms. Mixtures of alkanols can also be used.

Among the anilino derivatives, for instance, those repreesented by Formula II which may be employed in the practice of the present invention may be mentioned, for instance, aniline, 2-methyl aniline, 2,5-dimethyl aniline, 2,6-dimethyl aniline, 2,4,6-trimethyl aniline, 2-ethyl aniline, pentamethyl aniline, 2-phenyl aniline, 4-phenyl aniline, 2,6-diphenyl aniline, etc. Mixtures of anilino derivatives can also be used.

My reaction can be carried out in the conventional type of reactor used for vapor phase reactions over a solid catalyst. I generally use a tubular reactor, for example, a glass or metal tube which is filled with a static bed of magnesium oxide. The reactor is heated by any conventional means; for example, it is conveniently heated either by surrounding the reactor with an electrical heater, a heated gas, or a liquid such as a fused salt bath, liquid metal, etc., which can be conveniently maintained at reaction temperature by use of immersion-type electrical heaters. Because of the good heat transfer between a liquid and the reactor walls, a fused salt bath or other liquid medium generally gives the best temperature control of the reaction, although any means of heating may be used. Alternatively, a fluid bed reactor may be used.

The alkanol and anilino derivative can be mixed to form a solution which is then vaporized or separate streams of the two reactants may be fed to the same or separate vaporizers and then to the reactor. In order to minimize decomposition in the vaporization of the reactants, the vaporizer may be maintained at a minimum temperature necessary to vaporize the reactants and the vapor of the reactants preheated prior to entering the reactor by passing through a metal or glass tube which is heated by the same heating medium used to heat the reactor. In this way, no cooling of the initial part of the reactor occurs due to the necessity of heating the reactants up to the reaction temperature.

Any one of the above anilino derivatives together with the alkanol is vaporized and passed through a reactor containing the magnesium oxide maintaining a temperature in the range of about 375–600° C. In order to obtain the maximum yield of mono-alkylated products, I prefer to use at least one mole of alkanol and preferably from 1 to 6 moles or more of alkanol for each mole of anilino derivatives to be alkylated For example, if aniline is to be methylated to produce a maximum yield of N-methyl-aniline, I prefer to use 2 to 6 moles of methanol for each mole of aniline with maximum yields obtained with the higher ratio, i.e., 4 to 6 moles of methanol to 1 mole of aniline. Surprisingly enough, with these high ratios of methanol to aniline, essentially no N,N-dimethyl aniline is observed and little if any nuclear methylation occurs. Most of the excess methanol which is used can be recovered unchanged from the reaction product mixture and reused as can also any unreacted aniline.

The alkylation of the anilino derivative is believed to follow a mechanism whereby the alkanol is first decomposed to the corresponding aldehyde. For example, in the reaction of methanol with aniline, at the elevated temperatures and in the presence of the magnesium oxide catalyst, it is believed that the methanol is dehydrogenated to formaldehyde and, by means of an imino mechanism, the formaldehyde serves as an accelerator for the reaction. At the upper part of the temperature scale at which the reaction is carried out, dehydrogenation of methanol to formaldehyde occurs more rapidly than it does at the lower temperature range so that once the reaction is started by the decomposed methanol, the reaction proceeds readily to alkylate the aniline.

However, at the lower temperature ranges, for instance, about 375 to 425° C., because of the reduced tendency of the methanol to convert to formaldehyde, it may be desirable to add some formaldehyde to the methanol feed thereby to supplement the formaldehyde obtained from the decomposition of the methanol. Improvements in yield of the N-methyl aniline can be obtained if from 1 to 20 mole percent of the methanol is substituted with formaldehyde. Substitution of the other alkanols with their corresponding aldehydes can also have a beneficial effect on the yield of the alkylated anilino derivatives.

The vapors issuing from the reactor are condensed in the usual fashion and the products separated in the usual manner, for example, by crystallization, distillation, etc. The reaction proceeds smoothly at atmospheric pressure which makes it convenient to carry out the reaction since it eliminates the need for pressure equipment and any hazards from the use of high pressure. Pressures above or below atmospheric pressure however are not excluded.

As will be apparent to those skilled in the art, my process can be carried out under a variety of reaction conditions. These conditions are temperature pressure flow rate of reactants vapor space velocity of the reactants over the catalyst contact time of the reactants with the catalyst length of the catalyst bed specific activity of the particular catalyst etc. The effects of these reaction variable are those to be expected from a consideration of the technical aspects of the reaction involved. For example, the reaction of methanol with the aniline to produce the desired methylated product proceeds faster as the catalyst bed temperature is increased providing that the temperature is not so high that secondary reactions such as decomposition of the reactants or products occur to decrease the yield of desired product. Such secondary reactions do not occur to any appreciable extent in my reaction up to a temperature of 600° C. Above 600° C., decomposition of the reactants and product may cause deposition of carbon on the catalyst, decreasing its activity. Below a temperature of about 375° C., the reaction of methanol with the aniline is considerably slower so that the yield of product per hour per volume of catalyst is lower, usually making the reaction uneconomical to carry out.

To compensate for the lower rate of reaction in the range of 375°–475° C., a longer contact time of the reactants with the catalyst should be used. This may be done by changing any one or several of the variables which decrease the vapor space velocity of the reactants over the catalyst, thus increasing the contact time. Examples of this are increasing the amount of catalyst, decreasing the flow rate of reactants, increasing the pressure in the reactor, etc. Inert diluents for the reaction can be employed with the reactants, for example, an inert gas, i.e., nitrogen, argon, etc., or an inert vapor, i.e., benzene, toluene, steam, etc.

Generally, reaction conditions are chosen so as to minimize the amount of unreacted feed materials which must be recovered and reused. However, reaction conditions which on the face might appear undesirable from an overall yield point of view may be desirable from an economic point of view because of the very high degree of selectivity of the reaction under such conditions to give exclusively only N-monoalkylated products.

It will also be recognized that, because of differences in the specific activities of magnesium oxide catalysts, each particular magnesium oxide catalyst will have different optimum reaction conditions than another magnesium oxide catalyst. The more reactive the catalyst, the shorter the contact time needs to be to give the same degree of conversion to monoalkylated products. Therefore, a higher space velocity or a lower temperature may be used with a more reactive catalyst.

It is thus seen that my process provides a very flexible process for the monoalkylation of anilino derivatives. Using magnesium oxide as the catalyst, methanol can be reacted with an anilino derivative in the temperature range of 375°–600° C., under a variety of pressure, space velocity and flow conditions with or without the use of diluents, and with or without the use of formaldehyde, to suit the individual desires of the operator to give a high conversion of the anilino derivative to methylated products with a very high degree of selectivity for the monoalkylation to occur.

Any magnesium oxide is suitable for use in my process. Preferably, the magnesium oxide should be as free as possible of oxides of compounds which tend to be acidic in nature such as aluminum oxide, silica, etc., but minor impurities of these materials can be tolerated. If such acidic materials are dense, e.g., fired to a temperature where they have fused or sintered, they become more or less inert and may be used as a support for the magnesium oxide without detrimental effect. Oxides of metals which are basic in nature as in magnesium oxide, e.g., zinc oxide, lead oxide, etc., when present in minor proportions, have a promoting action which increases the activity of the magnesium oxide, even though if these compounds were used alone they would not have the same reactivity and selectivity as alkylation catalysts in my reaction as does magnesium oxide. These promoters can be used as a heterogeneous mixture throughout the catalyst bed, coprecipitated with the magnesium oxide, or as a separate zone at the inlet end of the reactor. If used, they are generally present in amounts up to 10% by weight of the total catalyst weight. In order to prevent vapors of reactants from sweeping particles of the catalyst from the reactor, it is desirable that the particle size of the magnesium oxide be at least large enough that it will remain in the reactor.

As would be expected, the reactivity of a given volume of catalyst is dependent on the surface of the catalyst exposed to vapors of the reactants. For a given particle size, the most reactive catalyst is that in which the particles are extremely porous. Porous particles of magnesium oxide may readily be obtained by thermal decomposition of particles of a thermally decomposable magnesium compound which does not melt or sinter on heating. Magnesium carbonate, basic magnesium carbonate, and magnesium hydroxide make ideal compounds to be thermally decomposed to porous particles of magnesium oxide. The two magnesium carbonates give a more porous magnesium oxide than magnesium hydroxide, since they give off a greater volume of gas on being thermally decomposed. The more porous the catalyst, the greater volume a given weight of catalyst will occupy. If desired, the magnesium compound may be coated on an inert carrier and then thermally decomposed to give a porous magnesium oxide coating on the inert substrate. Magnesium oxide obtained by thermal decomposition will tend to sinter and become less porous if heated too hot. I prefer to carry out the thermal decomposition of the magnesium compound in the same temperature range as the magnesium oxide will be exposed to in my reaction, e.g., at the temperature range of above 375° C. to as high as 600° C. In this way I obtain a magnesium oxide which is thermally stable under the reaction condi-